United States Patent [19]

McGaffigan et al.

[11] Patent Number: 5,376,774
[45] Date of Patent: Dec. 27, 1994

[54] LOW EMISSION INDUCTION HEATING COIL

[75] Inventors: Thomas H. McGaffigan, Half Moon Bay; Frank A. Doljack, Pleasanton; Cristian C. Filimon, Sunnyvale, all of Calif.

[73] Assignee: Electric Power Research Institute, Palo Alto, Calif.

[21] Appl. No.: 1,616

[22] Filed: Jan. 8, 1993

Related U.S. Application Data

[62] Division of Ser. No. 974,734, Nov. 13, 1992.

[51] Int. Cl.$^5$ ............................................. H05B 6/12
[52] U.S. Cl. ................................... 219/624; 219/675; 219/671; 336/232
[58] Field of Search ............. 219/10.493, 10.67, 10.79, 219/10.75, 10.71, 624, 675, 662, 671; 336/232, 220

[56] References Cited

U.S. PATENT DOCUMENTS

| | | | |
|---|---|---|---|
| 3,424,886 | 1/1969 | Ross | 219/10.79 |
| 3,725,630 | 4/1973 | Gagliardi | 219/10.79 |
| 3,989,916 | 11/1976 | Amagami et al. | 219/10.493 |
| 4,629,843 | 12/1986 | Kato et al. | 219/10.493 |
| 4,792,652 | 12/1988 | Seguy et al. | 219/10.493 |
| 4,959,631 | 9/1990 | Hasegawa et al. | 336/232 |
| 4,987,828 | 1/1991 | Nuns et al. | 219/10.493 |
| 5,053,593 | 10/1991 | Iguchi | 219/10.493 |
| 5,134,265 | 7/1992 | Dickens et al. | 219/10.493 |
| 5,194,708 | 3/1993 | Carter, Jr. | 219/10.493 |

Primary Examiner—Philip H. Leung
Attorney, Agent, or Firm—Howard L. Rose

[57] ABSTRACT

Solenoid coils are provided that produce relatively low irradiation of electromagnetic fields with intense fields internally thereof for purposes of heating a metallic element, preferably a ferromagnetic element having a Curie temperature selected for the purpose for which the coil structure is to be employed, the coil structure in one embodiment comprising two coaxial coils of substantially equal diameter interconnected to produce in response to an alternating current being applied thereto out of phase magnetic fields that do not substantially interfere with one another as a result of the spacing between the coils. In a second embodiment the two coils are located between two additional coils that buck axial fields thereby together with fall off of the fields as the cube of the distance from the main coils provide a structure with low external radiation. The method of forming the first coil structure includes winding a pancake coil in the form of a spiral, rotating out of the plane of the coil the innermost leg of the spiral to provide the desired spacing of the coils, forming the pancake into a cylindrical shape with the cross members of the pancake being laid one over the other to provide cancellation of the fields produced by these members.

7 Claims, 4 Drawing Sheets

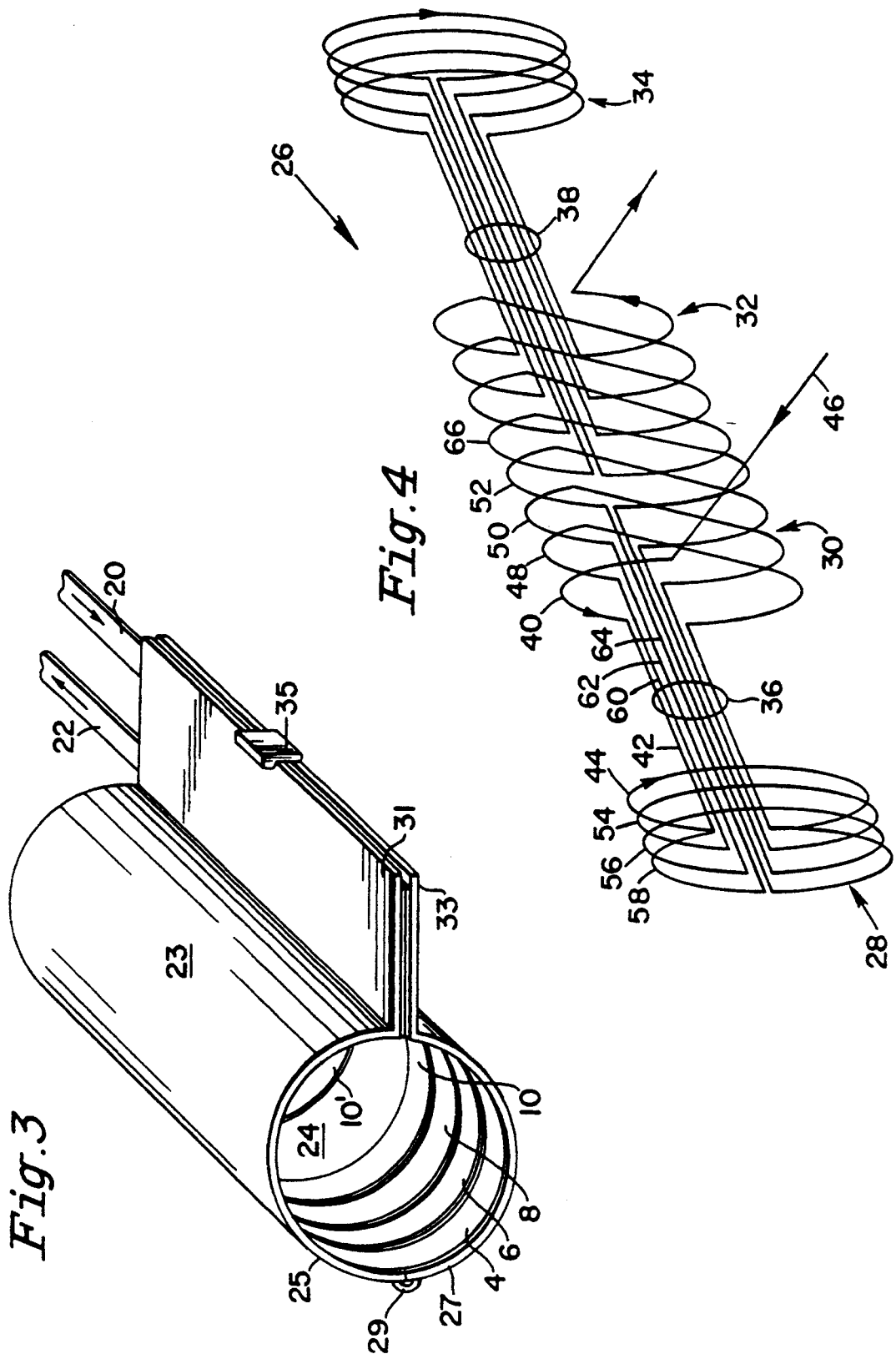

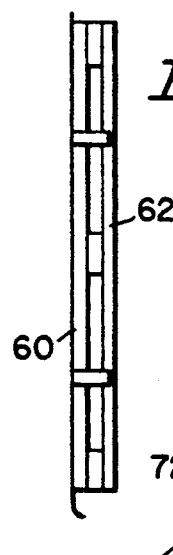
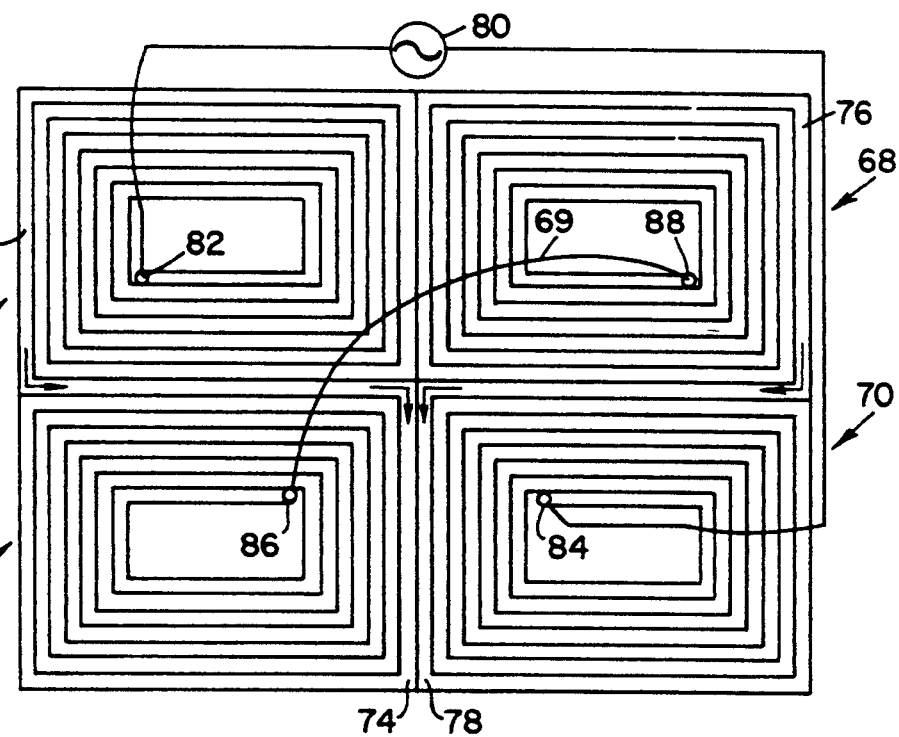
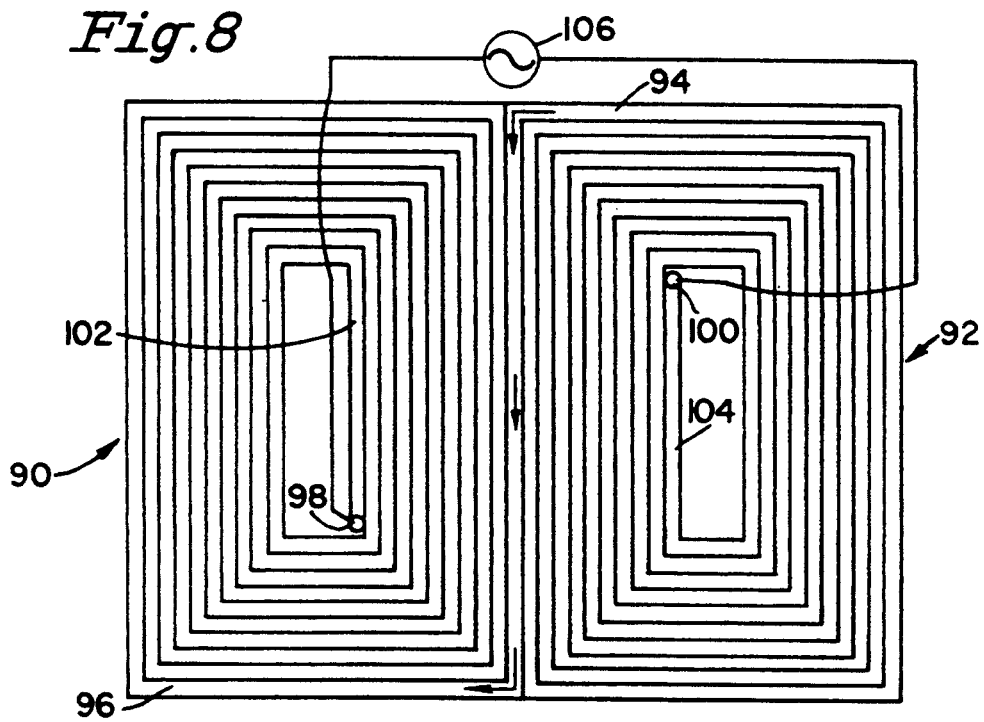

LOW EMISSION INDUCTION HEATING COIL

This is a division of application Ser. No. 07/974,734, filed Nov. 13, 1992.

This application is related to U.S. Ser. No. 07/657,996 filed Feb. 20, 1991 entitled "System and Method for Joining Plastic Materials"; U.S. Ser. No. 07/776,378 filed Jan. 24, 1992 entitled "Electro-Fusion Fitting"; and U.S. Ser. No. 07/915,849 filed Jul. 29, 1992 entitled "Electro-Fusion Fitting".

FIELD OF THE INVENTION

The present invention provides a method of fabricating and a structure including a hollow arcuate induction heating coil that produces low external radiation and more particularly to such a coil formed from a flat helically wound coil and a coil structure employing end coils to reduce radiation from interior coils.

BACKGROUND OF THE INVENTION

There are numerous induction coil structures in the induction heating and baking fields as well as the field of plastic pipe fusion such as exemplified in the latter case by U.S. Pat. No. 5,125,690; International Publication Nos. WO81/02405 and WO82/02593 and WO82/02124 in addition to the related applications cited above. The general theme of all of these applications and the patent is to employ a coil to inductively heat an element disposed between plastic members to be joined so as to heat the element; a metallic material, preferably a material such as a ferromagnetic material, that has its magnetic permeability materially reduced as a function of an increase of temperature beyond a threshold temperature. The threshold temperature is one which closely approaches the effective Curie temperature of the material. Such material in the references cited above is located in each instance between the members to be joined.

Although the coils of the references are effective to some extent to accomplish the intended results, external radiation of magnetic flux is now recognized as a problem; particularly so as the knowledge of damage that can be caused by such external radiation increases.

OBJECTS OF THE INVENTION

It is an object of the present invention to provide coil structures having low magnetic field radiation external to the coil.

It is another object of the present invention to provide an essentially hollow cylindrical coil structure that concentrates the magnetic field induced by an alternating electric current applied thereto interiorly of the coil and produces relatively little external magnetic radiation.

It is still another object of the present invention to provide a method of producing a magnetic coil that radiates a relatively low magnetic field external to the coil.

Yet another object of the present invention is to improve the overall level of emissions generated by induction cooking equipment for both the far field and near field conditions.

BRIEF DESCRIPTION OF THE PRESENT INVENTION

The coil of the present invention includes in one embodiment, two series of conductive rings being coaxial but spaced from one another, The rings are in the general form of a hollow cylinder with a second end of each ring of one series joined to a second end of a first ring of the other series of equal rank along the axis by a second conductor extending parallel to the axis of the cylinder and the first end of the ring of the other series joined to a first end of a second ring of the first series by a first conductor of a series of such conductors, The conductors interconnecting the conductive rings are in an overlapping array so as to buck each other's field, a plane intersecting them being remote from the axis of the cylinder. The interconnection of rings is outermost rings joined and remaining rings following in sequence the same order.

In this manner the magnetic fields produced by the structure rings of the two series are out of phase with one another interiorly of the cylindrical rings. As a result of the space between the coils, the fields interiorly of the rings are intense while the usual advantages of a solenoid relative to external radiation are retained. Also the fields produced by the two sets of conductors interconnecting the rings of the two series since the current therein flow in opposite directions buck one another materially reducing radiation from these conductors.

The coil structure described above may be fabricated by winding a rectangular pancake spiral of conductors with the unconnected end of the outermost conductor connectable to a first terminal of a source of alternating current and the unconnected end of the innermost conductor turned outwardly at its connected end to provide a space between two sets of conductors and a member to be connected to a second terminal of a source of alternating current. To form the coil described above the ends of the turns are overlapped as the cylindrical turns are formed thereby providing the conductors interconnecting the cylindrical conductors.

In another embodiment of the present invention the same essential effect of the above-described arrangement is achieved with the same basic arrangement of the cylindrical coils but the interconnection of the two series of conductor rings is effected by two coils one lying at but spaced from each end of the two series of rings. All interconnections between the conductive rings of one series are affected by connection through, on a one-for-one basis, the turns of the adjacent coils. The desired effect results from cube drop off, i.e., the field drops off as the cube of the distance from the ends of the coils.

A flat pancake version of the structure of a four rectangular coil arrangement is employed in commercial griddles, for instance, for fast food establishments. As in the circular version there are an even number of coils with adjacent coils oriented so that current in adjacent cells flows in opposite directions, the coils being substantially abutting each other in a two coil by two coil array. The shape aspect ratio of the individual cells in a particular design may vary, specifically, the individual coils may be of the same shape and identical or different aspect ratios or they may be of both different shapes and aspect ratios.

The above and other features, objects and advantages of the present invention, together with the best means contemplated by the inventors thereof for carrying out their invention will become more apparent from reading the following description of a preferred embodiment and perusing the associated drawings in which:

BRIEF DESCRIPTION OF THE DRAWINGS

FIG. 3 illustrates the coil structure of the present invention in a clamshell;

FIG. 4 illustrates an alternative coil structure in accordance with the present invention;

FIG. 6 is a side view of a griddle employing a ferromagnetic heating surface and a pancake coil arrangement as illustrated in FIG. 7;

FIG. 7 is a top view of the coil structure employed in FIG. 6; and

FIG. 8 is a two coil version of the coil version of FIG. 7.

DETAILED DESCRIPTION OF THE PRESENT INVENTION

Figure 1:
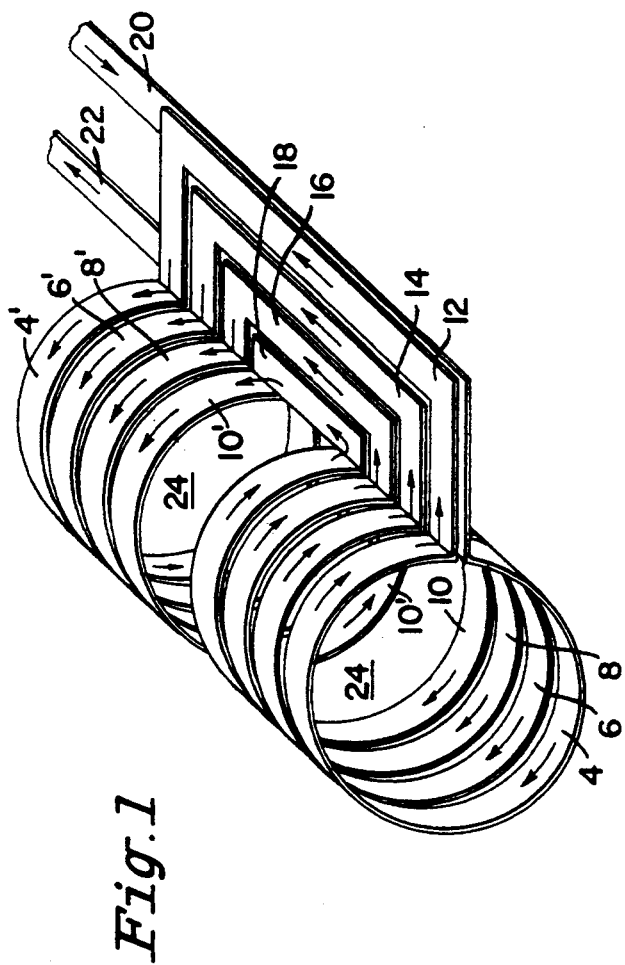
FIG. 1 illustrates the coil structure of the preferred embodiment of the present invention.

Referring specifically to FIG. 1 of the accompanying drawings, a coil structure 2 consists of a first series of conductive rings 4, 6, 8 and 10 and a second series of conductive rings, 4', 6', 8' and 10'. The number of conductive rings and width of conductors illustrated are exemplary only, the number of rings and width employed in any specific application being a function of the length of the members to be treated and the current to be carried. Conductive rings 4 and 4' are interconnected by conductor 12, conductive rings 6 and 6' are interconnected by conductor 14, conductive rings 8 and 8' by conductor 16 and conductive rings 10 and 10' by conductor 18. All of the interconnections discussed above are of the ends of the conductive rings visible in FIG. 1. The ends of the conductive rings not visible in FIG. 1 are interconnected by conductors 12', 14' and 16' as illustrated in FIG. 2 of the accompanying drawings.

The lower end as illustrated in FIG. 1 of conductive ring 4 is connected via a conductor 20 to one terminal of a source of alternating current (not illustrated). The end of the conductive ring 10' is connected via a conductor 22 to the other terminal of the aforesaid source of alternating current.

Figure 2:
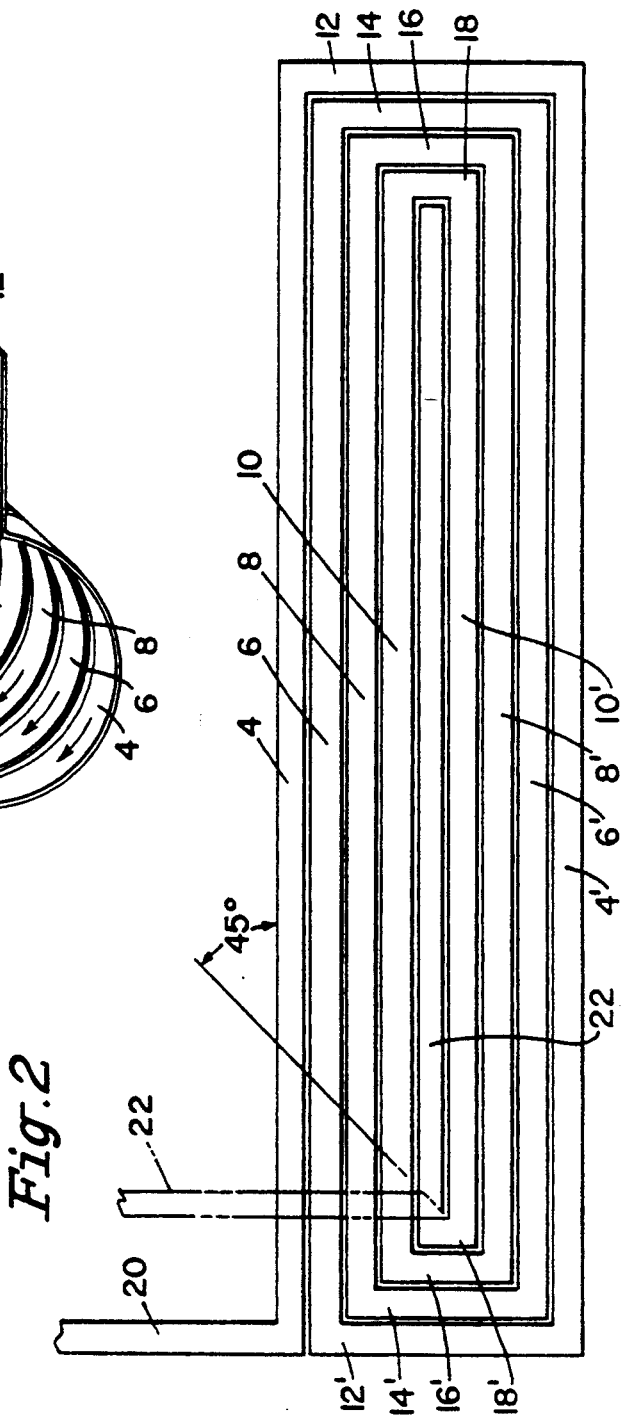
FIG. 2 illustrates a flat spiral from which the coil structure of FIG. 1 may be fabricated.

The pattern of current flow in the conductive rings and conductors is as illustrated by arrows in FIG. 1, such flow being obvious from the basic configuration of the structure as illustrated in FIG. 2.

Referring to FIG. 2, the structure of FIG. 1 is achieved by winding a flat spiral (pancake coil) starting with member 4 and winding a rectangular spiral ending with center conductor 22. The center conductor is folded at 90° to the elongated dimension of the conductors 4, 4', etc. to provide the lead 22 and to divide the conductive members into two groups, providing space air gap 24 of FIG. 1. Conductor 20 forming a continuation of conductor 4 is parallel to conductor 22 in its folded position as illustrated clearly in FIG. 2.

To form the structure of FIG. 1 from the structure of FIG. 2, the conductors 12, 14, 16 and 18 are folded over top of conductors 12', 14', 16' and 18' while the conductors 4, 6, 8, 10, 4', 6', 8' and 10' are formed into the corresponding conductive rings.

It is noted that in all positions of the rings the currents in the rings produce out-of-phase fields interiorly thereof. The air gap or space 24 substantially isolates the fields produced by the two coils thus forming two out-of-phase, low emitting solenoids with the crossover members 12, 14, 16 and cancelling the field produced by the crossover members (not illustrated) and the fields of the members 20 and 22 also cancelling one another. While the fields external to the rings are quite weak as is the case in most solenoid configurations.

Referring to FIG. 3 of the accompanying drawings, there is illustrated a clamshell incorporating the coil structure of FIG. 1. The coil structure 2 of FIG. 1 is secured interiorly of a clamshell 23 comprised of two half sections 25 and 27 (jaws) hinged to one another by a hinge 29. As indicated, the coil structure 2 as represented by conductive members 4, 6, 8 and 10, is secured interiorly of the clamshell and since the conductive members are quite thin they flex when the members 25 and 27 are rotated about hinge 29 to open the clamshell so as to permit side entry of a heater (a load) into the opened jaws.

The jaws 25 and 27 have outwardly extending parallel flat surfaces or lips 31 and 33 disposed over (enclosing) the members 12, 14, 16, 18, 12', 14', 16' and 18' open the basic coil structure. The lips 31 and 33 are clamped closed by a latch 35 once the load is inserted and the jaws are closed.

Referring specifically to FIG. 4 of the accompanying drawings, there is provided an alternative coil structure for producing low electromagnetic radiations external to the coil.

Coil structure 26 includes four coils 28, 30 32 and 34 with coils 28 and 30 interconnected by wires 36 and coils 32 and 34 interconnected by wires 38. Turn 40 of coil 30 has one end connected via lead 42 of the wires 36 to a turn 44 of coil 28. A wire 46 is connectable to a source of alternating current (not illustrated) and is connected to the end of the turn 40 not connected to lead 42. Turns 48, 50 and 52 are connected to one end of turns 54, 56 and 58 respectively, by leads 60, 62 and 64 and the other end of turns 44, 54 and 56 are connected by leads of bundle of wires 36 to turns 48, 50 and 52. The other end of turn 58 is connected to one end of a lower arc of turn 52 which crosses over and connects to turn 66 of coil 32. The pattern of interconnections of coils 32 and 34 is a mirror image of the interconnections between coils 28 and 30 with one end of a turn 68 closest to coil 34 being connected to a second terminal of a power supply.

Figure 5:
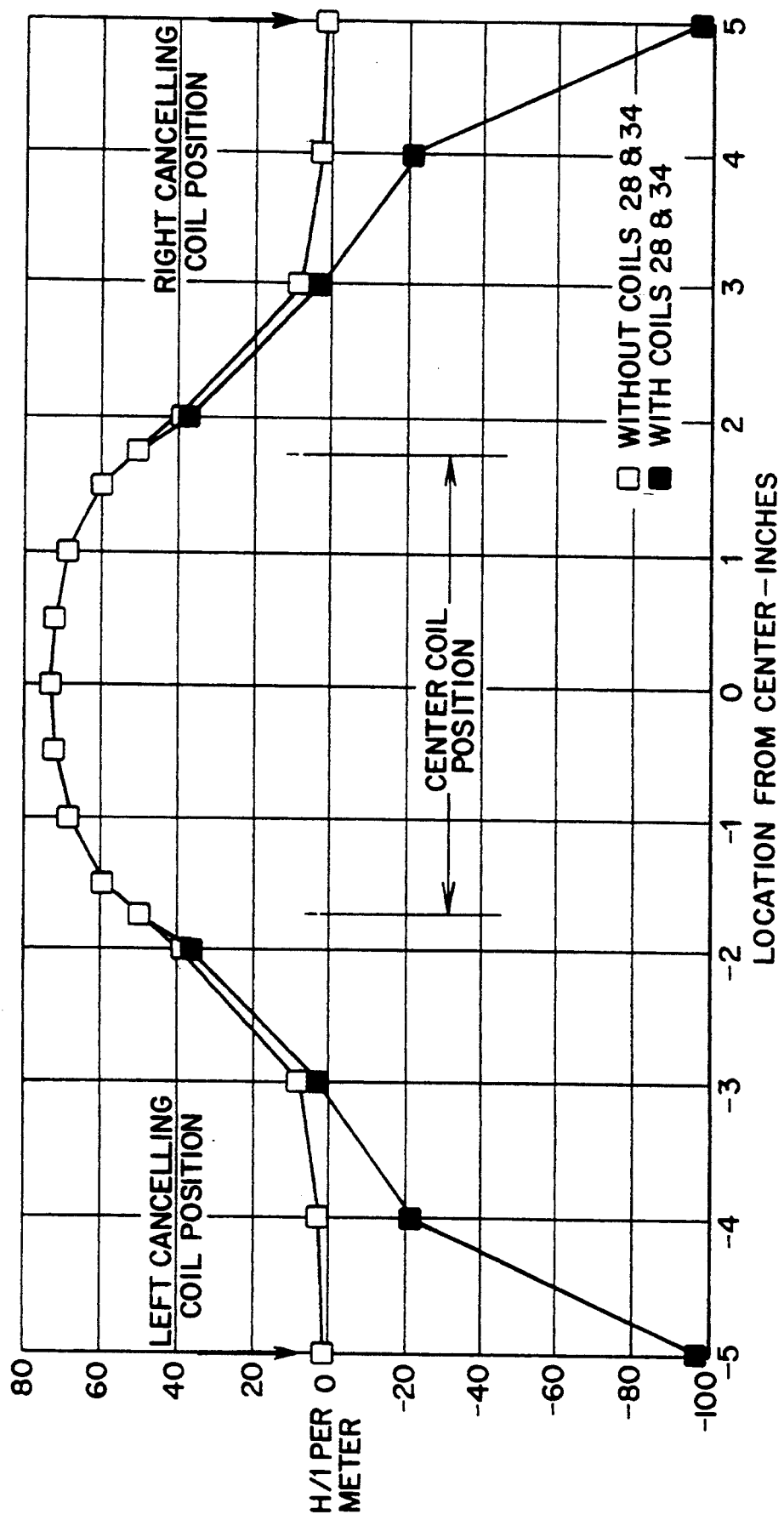
FIG. 5 is a graph of the Henries/per ampere per meter as a function of location from center of the coil structure of FIG. 4.

The pattern of electromagnetic radiation from this coil structure both with and without the coils 28 and 34 is illustrated by the graphs of FIG. 5. It is noted without coils 28 and 34, the level of radiation transmitted outwardly from the coils begins to exceed the radiation with the coils 28 and 34. The change in level begins to become significant at 0.3 inch from the center of the coil structure and at 0.5 inch the radiation with coils 28 and 34 is down 100 H/I from the structure without coils 28 and 34. This drop-off results from "cube" drop-off. It should be noted from FIG. 5 that the coils 28 and 34 are located 0.5 inch from the junction of coils 30 and 32, the center of the structure.

In use, normally the coils 30 and 32 are placed over the ferromagnetic material to be heated, that is, the heater, and preferably the field produced by the coil is sufficient to cause the ferromagnetic material to be heated to approximately its effective Curie temperature if Curie temperature regulation is desired. If desired, the coils 28 and 34 may also be employed to energize the heater and other heaters.

Referring now specifically to FIGS. 6 and 7 there is illustrated a flat version of the coil structure of FIG. 4 for use in griddles in, for instance, the fast food industry.

The structure includes a ferromagnetic plate 60 forming the surface of the heated griddle. The coil structure of the present invention is element 62 and the intermediate layers are structure elements holding the various elements together.

The details of the coil structure are illustrated in FIG. 7. It has been determined that the unwanted emissions generated by induction heating equipment can be considerably diminished if the coil that couples the electromagnetic field to the ferromagnetic load is designed as an array of an even number of cells, oriented in such a way that adjacent cells generate electromagnetic fields with opposite directions.

A four cell arrangement is illustrated in FIG. 7. Four cells or rectangular pancake coils 64, 66, 68 and 70 are interconnected in the same manner as the cylindrical coils of FIG. 4. Coil 64 has an outermost turn 72 connected to outermost turn 74 of coil 66. Outermost turn 76 of coil 68 is connected to outermost turn 78 of coil 70. A current supply 80 is connected across ends 82 and 84 of the innermost turns of coils 64 and 70, respectively. The ends 86 and 88 of the innermost turns of coils 66 and 68, respectively, are connected together by lead 69. Thus the currents flowing in each coil are in the same direction as that in the two coils adjacent thereto. Therefore this arrangement is the same so far as current flows are concerned as the coil structure of FIG. 4.

A two coil arrangement of a pancake version of FIG. 4 is illustrated in FIG. 8. Two flat coils 90 and 92 have their outermost coils 94 and 96, respectively, connected together and ends 98 and 100 of innermost turns 102 and 104 connected across an ac source 106. Once again the current flows in the adjacent coils are in the opposite directions.

In the chart below the intensity of the magnetic fields measure 15" and 30" away from the 2 and 4 coil arrays as displayed. The "rectangular" coil is the prior art single coil.

| Coil type | Distance of a loop antenna from coil plate array | | | |
|---|---|---|---|---|
| | d-15" | | d-30" | |
| | perp. | parallel | prep. | parallel |
| Rectangular | 20 mV | 200 mV | 4 mV | 38 mV |
| Rectangular with two cells (FIG. 8) | 9 mV | 43 mV | 1.6 mV | 3.2 mV |
| Rectangular with four cells (FIG. 7) | 2 mV | 1.8 mV | 1 mV | 1 mV |

Thus it is shown that the coil arrangement of FIGS. 7 and 8 are effective in reducing magnetic radiation, particularly the four coil array.

The frequency of the current preferably is 13.56 MHz but other frequencies may be employed with excellent results. The term "effective Curie temperature" relates to the temperature at which there is a marked decrease in the permeability, a decrease sufficient to reduce the heating so that the hater begins to cool and again becomes ferromagnetic. Such temperature may be 1° C. to 100° C. less than the absolute Curie temperature depending upon the ferromagnetic material used. If Curie point temperature control is to be employed a constant current power supply is preferred so that the standard $P = I^2R$ becomes $P = KR$ so that when effective Curie temperature is reached and the factor R decreases heating is decreased. As previously indicated the term "ferromagnetic" is employed herein to include any materials whose resistance reduces materially with temperature and includes without limitation ferromagnetics, ferrimagnetics and ferrites.

Once given the disclosure, many other features, modifications and improvements will become apparent to the skilled artisan. Such other modifications, features and improvements are, therefore, considered a part of this invention, the scope of which is to be determined by the following claims.

What is claimed is:

1. A griddle comprising
   a generally flat ferromagnetic plate,
   a flat coil structure generally parallel to and electrically insulated from said ferromagnetic plate,
   said coil structure including at least two flat, rectangular spiral coils abutting one another, and
   means interconnecting said coils so that currents in said coils flow in the same direction.

2. A griddle according to claim 1 wherein
   said coil structure includes four coils in a two by two array,
   said coils interconnected such that current in each coil flows in the same direction as both adjacent coils.

3. A flat pancake coil structure comprising
   an even number of flat rectangular pancake coils of an equal number of turns;
   said coils abutting one another,
   said turns being in rectangular spiral form with a length of an outermost turn of each of two abutting coils being common to both said abutting coils,
   said common outermost length interconnecting said coils such that current flows in the same direction in said coils.

4. A pancake coil according to claim 3 wherein there are four such coils arranged in squares.

5. A pancake coil according to claim 3 further comprising
   means for connecting a source of current to innermost ends of adjacent coils.

6. A flat pancake coil structure comprising
   an even number of flat rectangular pancake coils of an equal number of turns,
   said turns being in a rectangular spiral configuration
   each said coil having an outer turn of the spiral of each coil abutting one another over their lengths and electrically interconnected such that the current flowing in each outer turn flows in the same direction.

7. A flat pancake coil structure comprising
   four rectangular coils arranged in a generally square configuration,
   said square configuration comprising two groups of two interconnected coils abutting one another such that all abutting turns have the current flowing therein in the same direction,
   the innermost turn of one coil of each group being interconnected, and
   an innermost turn of a different coil of each group having means to connect the coils across a source of alternating current.

* * * * *